US012681506B2

(12) United States Patent
Kelber et al.

(10) Patent No.: US 12,681,506 B2
(45) Date of Patent: Jul. 14, 2026

(54) VEHICLE BEING OPERABLE IN AN AUTONOMOUS DRIVING MODE AND ACTIVATION DEVICE FOR ACTIVATING THE AUTONOMOUS DRIVING MODE

(71) Applicant: AGCO International GmbH, Neuhausen (CH)

(72) Inventors: Christian Roberto Kelber, Marktoberdorf (DE); Oliver Kreil, Marktoberdorf (DE); Michael Sinning, Marktoberdorf (DE)

(73) Assignee: AGCO International GmbH, Neuhausen am Rheinfall (CH)

( * ) Notice: Subject to any disclaimer, the term of this patent is extended or adjusted under 35 U.S.C. 154(b) by 137 days.

(21) Appl. No.: 18/704,350

(22) PCT Filed: Nov. 3, 2022

(86) PCT No.: PCT/IB2022/060583
§ 371 (c)(1),
(2) Date: Apr. 24, 2024

(87) PCT Pub. No.: WO2023/094917
PCT Pub. Date: Jun. 1, 2023

(65) Prior Publication Data
US 2025/0004484 A1 Jan. 2, 2025

(30) Foreign Application Priority Data

Nov. 24, 2021 (GB) ...................................... 2116888

(51) Int. Cl.
*G05D 1/81* (2024.01)
*A01B 69/04* (2006.01)
(Continued)

(52) U.S. Cl.
CPC ............. *G05D 1/81* (2024.01); *A01B 69/008* (2013.01); *B60T 7/08* (2013.01); *B60T 7/12* (2013.01); *B60T 8/1701* (2013.01); *B60T 8/171* (2013.01); *B60T 13/68* (2013.01); *G05D 1/85* (2024.01); *B60T 7/04* (2013.01); *B60T 2260/09* (2013.01);
(Continued)

(58) Field of Classification Search
None
See application file for complete search history.

(56) References Cited

U.S. PATENT DOCUMENTS 5,684,696 A 11/1997 Rao et al.
9,429,944 B2 8/2016 Filippov et al.
(Continued)

OTHER PUBLICATIONS

UK Intellectual Property Office, Search Report for related UK Application No. GB2116888.5, dated May 17, 2022, 3 pages.
(Continued)

*Primary Examiner* — Tamara L Weber

(57) ABSTRACT

A vehicle (22) being operable in an autonomous driving mode having a parking brake (17) with a first actuation unit (9) configured to apply or release the parking brake (17); an activation device (10) configured to activate or deactivate the autonomous driving mode; an interlock (11), wherein the interlock (11) is configured to prevent an activation of the autonomous driving mode unless the parking brake (17) is applied by the first actuation unit (9).

17 Claims, 1 Drawing Sheet

(51) Int. Cl.

| | |
|---|---|
| *B60T 7/08* | (2006.01) |
| *B60T 7/12* | (2006.01) |
| *B60T 8/17* | (2006.01) |
| *B60T 8/171* | (2006.01) |
| *B60T 13/68* | (2006.01) |
| *G05D 1/85* | (2024.01) |
| *B60T 7/04* | (2006.01) |
| *G05D 105/15* | (2024.01) |
| *G05D 107/20* | (2024.01) |

(52) U.S. Cl.
CPC ..... *G05D 2105/15* (2024.01); *G05D 2107/21*
(2024.01)

(56) References Cited

U.S. PATENT DOCUMENTS

| | | | |
|---|---|---|---|
| 10,219,422 B2 | 3/2019 | Buhler et al. | |
| 2007/0198145 A1* | 8/2007 | Norris ..................... H04L 67/12 | |
| | | | 701/23 |
| 2018/0067486 A1 | 3/2018 | Yako et al. | |
| 2019/0317501 A1* | 10/2019 | Foster .................. G05D 1/0088 | |
| 2020/0139950 A1 | 5/2020 | James et al. | |
| 2020/0293034 A1 | 9/2020 | Shibata et al. | |
| 2020/0361481 A1 | 11/2020 | Whitfield, Jr. et al. | |
| 2021/0300431 A1 | 9/2021 | Kim et al. | |

OTHER PUBLICATIONS

European Patent Office, International Search Report related to International Patent Application No. PCT/IB2022/060583 mail date Feb. 3, 2023, 14 pages.

* cited by examiner

VEHICLE BEING OPERABLE IN AN AUTONOMOUS DRIVING MODE AND ACTIVATION DEVICE FOR ACTIVATING THE AUTONOMOUS DRIVING MODE

CROSS-REFERENCE TO RELATED APPLICATIONS

This application is a national phase entry under 35 U.S.C. § 371 of International Patent Application PCT/IB2022/060583, filed Nov. 3, 2022, designating the United States of America and published in English as International Patent Publication WO 2023/094917 A1 on Jun. 1, 2023, which claims the benefit of the filing date of U. K. Patent Application 2116888.5, "Vehicle Being Operable in an Autonomous Driving Mode and Activation Device for Activating the Autonomous Driving Mode," filed Nov. 24, 2021, the entire disclosure of which is incorporated herein by reference.

FIELD

The present disclosure relates generally to a vehicle being operable in an autonomous driving mode having an activation device for activating the autonomous driving mode.

BACKGROUND

Vehicles being operable in an autonomous driving mode are used in agriculture, construction and many other fields of application. In case of agriculture such kind of vehicles can be a tractor, a forage harvester, a sprayer or a combine harvester for example driving, braking and steering autonomously through an agricultural field without an operator interaction. The autonomous driving mode can be actuated by an activation device.

SUMMARY

Since the autonomous driving mode is a safety relevant feature it is an objective to present a vehicle enabling a safe activation as well as a safe operation of the autonomous driving mode.

In an aspect of the invention a vehicle being operable in an autonomous driving mode can comprise a parking brake with a first actuation unit configured to apply or release the parking brake, an activation device configured to activate or deactivate the autonomous driving mode, an interlock, wherein the interlock is configured to prevent an activation of the autonomous driving mode unless the parking brake is applied by the first actuation unit.

When the parking brake is applied the vehicle can be hold at standstill without further interaction of a driver. The driver can leave the vehicle and the unmanned vehicle doesn't move away. Besides this static braking, the parking brake can be used for dynamic braking to slow down the vehicle to bring it to standstill, for example in case of an emergency if a service brake of the vehicle fails. I. e., the parking brake can establish a safe state of the vehicle by bringing and holding the vehicle at a standstill.

The interlock ensures that the autonomous driving mode can be activated only when the parking brake of the vehicle is applied. The parking brake is applied when an operator applies the first actuation unit. Thus, a safe state of the vehicle is established before the autonomous driving mode will be activated because the vehicle is braked before the activation of the autonomous driving mode.

The interlock can be configured to prevent an activation of the autonomous driving mode by blocking an actuation of the activation device for the autonomous driving mode. For example, the interlock can be a mechanical interlock releasing an actuation of the activation device when the parking brake is applied and blocking an actuation of the activation device when the parking brake is released. The mechanical interlock can interact with the first actuation unit so that the interlock releases an actuation of the activation device when the first actuation unit is operated to apply the parking brake. The activation device for the autonomous driving mode can be a button to be pressed by an operator.

Alternatively, the interlock can be an electronical interlock ignoring a signal to activate the autonomous driving mode unless the parking brake is applied.

The interlock can be integrated in the first actuation unit. The integration of the interlock into the first actuation unit enables a compact configuration.

The parking brake can be configured to be released when the autonomous driving mode is activated. Since the autonomous driving mode can be activated only when the parking brake is applied the applied parking brake would still hold the vehicle at standstill after the activation of the autonomous driving mode. To enable the driving functionality of the vehicle after the activation of the autonomous driving mode the parking brake needs to be released. Thus, the parking brake can be released while the first actuation unit remains in an operated state to apply the parking brake. To avoid that the vehicle will start moving unintentionally after the releasing of the parking brake, a service brake can be applied as described later.

The parking brake can be configured to be released automatically when the first actuation unit is operated to apply the parking brake and the autonomous driving mode is activated. I. e., the activation device for the autonomous driving mode can be connected with the parking brake to release the parking brake when the activation device is applied for activating the autonomous driving mode. Thus, a separate control element besides the first actuation to release the parking brake is not necessary.

The vehicle can comprise a control unit configured to override a trigger signal of the first actuation unit to apply the parking brake by a trigger signal to release the parking brake when the autonomous driving mode is activated. In this case, the trigger signal of the first actuation unit to apply the parking brake can be represented by an absence of an electrical signal so that the parking brake keeps applied when the vehicle is turned off and no electrical current is supplied to the parking brake.

The parking brake can be configured to be applied automatically when a malfunction of the autonomous driving mode is present. Thus, the parking brake can be applied also when the parking brake was released due to an activated autonomous driving mode. A malfunction can be a loss of electrical energy, a broken signal line, etc., for example.

The first actuation unit can comprise a brake lever mechanism. The brake lever mechanism can be manually operated by an operator and pulled into a first position to apply the parking brake and pushed into a second position to release the parking brake.

The vehicle can comprise a service brake being electronically operable wherein the service brake comprises an interrupt configured to enable an electronical operation of the service brake when the parking brake is activated and to disable an electronical operation of the service brake when the parking brake is deactivated.

The vehicle can comprise a service brake being electronically operable wherein the service brake comprises an interrupt configured to enable an electronical operation of the service brake when the autonomous driving mode is activated and to disable an electronical operation of the service brake when the autonomous driving mode is deactivated.

The service brake can be used for dynamic braking to slow down the vehicle. But also static braking is possible. Compared to the parking brake, the service brake can typically generate higher brake forces. The control unit can be connected with the electronically operable service brake to apply or release the service brake. The control unit can process vehicle internal brake demands to adjust the vehicle speed during an active autonomous driving mode as well as vehicle external brake demands received remotely, e. g. from an operator outside of the vehicle. The interrupt of the service brake controls the electronical operability of the service brake to avoid that the service brake is electronically operated when the autonomous driving mode is deactivated.

The service brake can comprise an interface configured to receive a trigger signal for applying the service brake. For example, the interface can be connected with a joystick to use the service brake as a brake-by-wire system.

The interface can be configured to receive the trigger signal from an external unit, especially from a second vehicle. The external unit, respectively the second vehicle can be controlled by an operator while the other vehicle is unmanned and drives autonomously. In this case, the operator can supervise the autonomous driving operation of the other vehicle and take control over the other vehicle if a manual interaction is necessary, e. g. to stop the autonomous driving vehicle for preventing an accident. For example, the interface can comprise a receiver for enabling a remote control of the service brake and for receiving wireless control signals.

The service brake can comprise a second actuation unit operable by a driver of the vehicle to apply or release the service brake when the electronical operation of the service brake is disabled by the interrupt. The second actuation unit can be a foot actuated brake pedal to apply the service brake independently from the electronical operability of the service brake. Thus, a service brake operation is possible also when the autonomous driving mode is deactivated.

The service brake can be a fluid actuated brake comprising a valve controllable by an actuation of the second actuation unit and by the electronical operation to adapt a brake force of the service brake. A fluid actuated brake can be a hydraulic or a pneumatic brake. The brake force can be adapted by the pressure of the fluid wherein the pressure can be controlled by the valve. Since the valve can be controlled fluid-mechanically and electronically the service brake can be designed as an electro-hydraulic or electro-pneumatic brake system. Further, it is possible that the control unit can control the valve.

The autonomous driving mode can be configured to control the vehicle in relation to a second vehicle. For example, the autonomous driving mode can control the vehicle to follow a second vehicle and to keep a constant distance to the second vehicle. In this case, the second vehicle can also drive with an activated autonomous driving mode or can be controlled by an operator. The second vehicle can be of the same or of a different type of the other vehicle. The second vehicle can be a ground vehicle or an aerial vehicle.

The vehicle can be configured to indicate an activation of the autonomous driving mode to the second vehicle. Then, an operator controlling the second vehicle can check the status of the other vehicle. The activation of the autonomous driving mode can be indicated by an optical device as a LED.

The vehicle can be configured to receive a trigger signal to activate or deactivate the autonomous driving mode from an external unit, especially from a second vehicle.

For example, the interface can be configured to receive a trigger signal for activating or deactivating the autonomous driving mode from an external unit, especially from a second vehicle. Then, an operator can control the autonomous driving mode in a very comfortable way without the need to enter the vehicle for operating the activation device for activating or deactivating the autonomous driving mode. Instead, the operator can be located outside of the vehicle to control the autonomous driving mode remotely.

Within the scope of this application it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

Several aspects of the invention will now be described, by way of example only, with reference to the accompanying drawings, in which.

DETAILED DESCRIPTION

Figure 1:
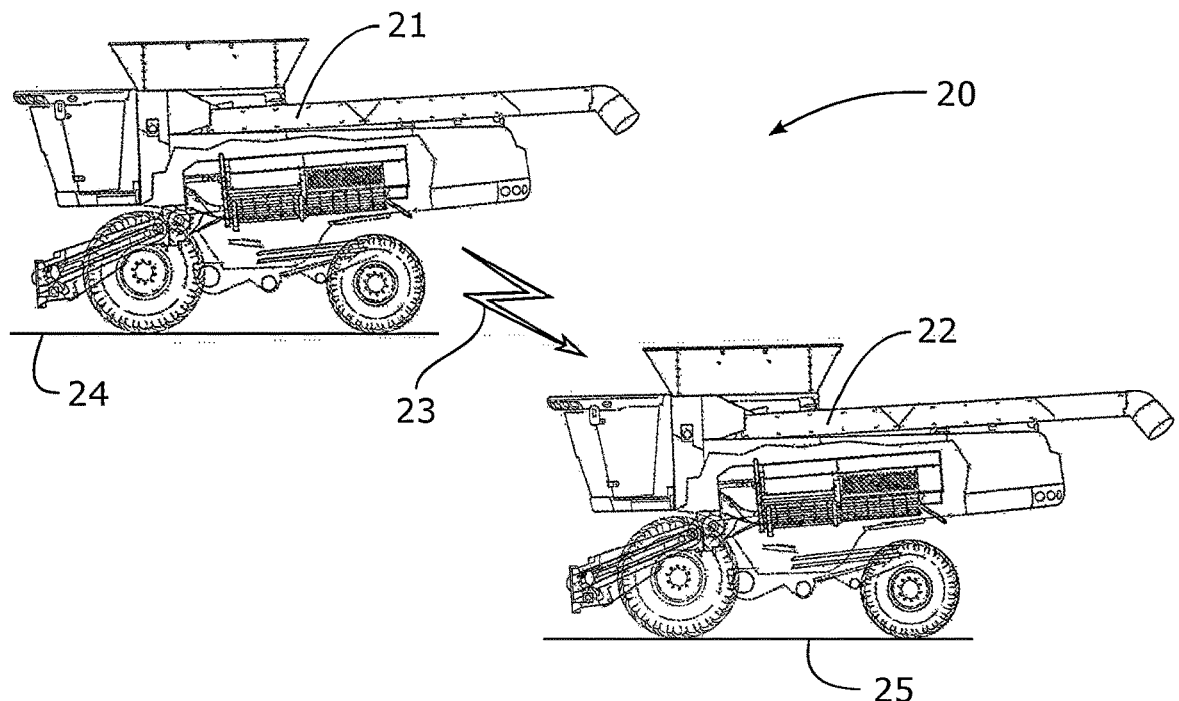
FIG. 1 shows an agricultural vehicle being operable in an autonomous driving mode following a second agricultural vehicle.

With reference to FIG. 1, a first agricultural vehicle 22 being operable in an autonomous driving mode is located on a track 25. A second agricultural vehicle 21 is located on a track 24 spaced apart from the track 25. Here, both vehicles 21 and 22 are depicted as combine harvesters but one or both vehicles could be of a different type as a tractor for example.

When the autonomous driving mode of the first vehicle 22 is activated, the first vehicle 22 can drive autonomously along a path, e. g. the track 25, without the need of an interaction of an operator. The first vehicle 22 controls automatically its acceleration, braking and steering as well as all other vehicle function to operate in an agricultural field. Alternatively, the autonomous driving mode can be used as platooning mode so that the first vehicle 22 is located anywhere around the second vehicle 21 and follows it autonomously at a distance.

The autonomous driving mode of the first vehicle 22 can be configured to operate jointly with the second vehicle 21. For example, the autonomous driving mode of the first vehicle 22 can be configured to take the role of a follower vehicle of a leader-follower system 20 wherein the role of the leader vehicle is assigned to the second vehicle 21. Then, the autonomous driving mode of the first vehicle 22 controls the first vehicle 22 in relation to the second vehicle 21. For example, the follower vehicle 22 performs automatically acceleration, braking or steering manoeuvers to keep a constant distance to the leader vehicle 21 or to keep a specific formation with the leader vehicle 21 as driving in parallel tracks 24 and 25.

Typically, the follower vehicle 22 operates unmanned while the leader vehicle 21 is controlled by an operator although the leader vehicle 21 could operate autonomously, too. So, the leader-follower system 20 enables an operator to control two or more vehicles simultaneously.

Both vehicles 21 and 22 can communicate with each other via a communications link 23. For example, control commands can be transmitted from the second vehicle 21 to the first vehicle 22 to be received from the first vehicle 22 for controlling the first vehicle 22. Vice versa, control commands or other signals can be transmitted from the first vehicle 22 to the second vehicle 21. So, the operator of the leader-follower system 20 can send a control signal, e. g. a braking signal, from the leader vehicle 21 to the follower vehicle 22 to bring the unmanned follower vehicle 22 to standstill. More information about leader-follower systems can be found in European patent application EP 3 139 237 A1, by Buhler Timothy et. al., published on 8$^{th}$ of Mar. 2017, which is incorporated by reference hereby.

The communications link 23 can be implemented as a wireless communications link as WLAN, Bluetooth, radio, infrared or any other communications method.

Figure 2:
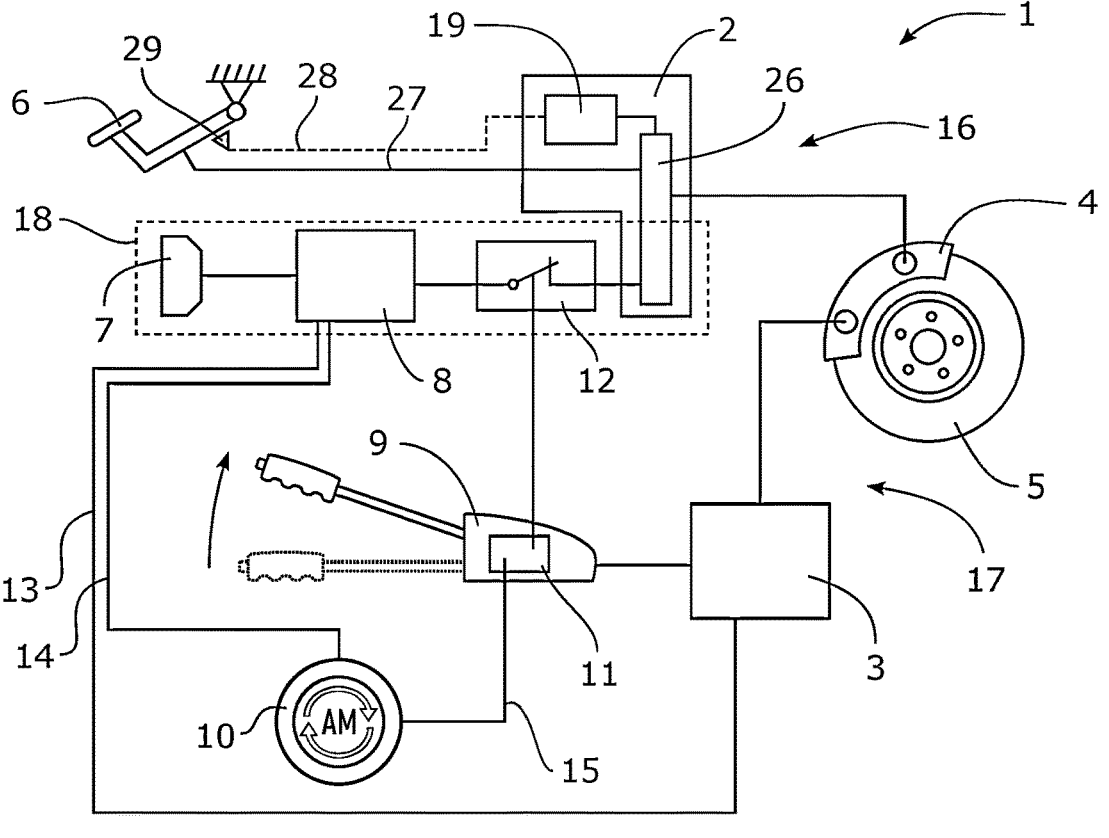
FIG. 2 shows a braking system and an activation device for activating the autonomous driving mode.

FIG. 2 shows schematically a braking system 1. This braking system 1 is implemented in the first vehicle 22 being operable in an autonomous driving mode, and comprises a service brake 16 and a parking brake 17. The service brake 17 comprises a service brake actuator 2 connected with a brake caliper 4 to exert a brake force on a brake disc 5 when the service brake actuator 2 is applied. Analogously, the parking brake 17 comprises a parking brake actuator 3 connected with the brake caliper 4 to exert a brake force on the brake disc 5 when the parking brake actuator 3 is applied.

The service brake 16 comprises at least a controllable valve 26 to adjust the brake force to be exerted on the brake disc 5. The valve 26 is connected with a control unit 19 that can automatically control the valve 26 to execute brake functions as anti-lock control or electronic stability control. The control unit 19 can be integrated in any part of the service brake 16, as for example in the service brake actuator 2.

The service brake 16 can be actuated in two different ways: On the one hand, the service brake 16 comprises an actuation unit 6 to be operated by a human, e. g. a brake pedal to be stepped by an operator, to control the service brake actuator 2 for applying or releasing the service brake 16. The brake pedal is connected with the valve 26 by a hydraulic or mechanic linkage 27 to adjust the valve 26 according to the actuation of the brake pedal. A fluid is used to transfer the brake forces wherein the valve 26 controls the flow of the fluid.

On the other hand, the service brake 16 comprises a brake-by-wire system 18 for an electronical operation and control of the service brake actuator 2 to apply or release the service brake 16 by electric signals. The brake-by-wire system 18 comprises a control unit 8 connected with an interface 7 to receive a trigger signal for applying the service brake actuator 2 which itself is connected with the control unit 8.

The trigger signal can be generated by an internal device of the first vehicle 22 (follower vehicle), e. g. a distance control system or a collision avoidance system, to perform an automatic brake operation. Further, the trigger signal can be generated by the operator of the leader vehicle 21 and sent to the interface 7 via the wireless communications link

23. The control unit 8 is connected with the valve 26 and generates an electric signal according to the trigger signal to control the electrically controllable valve 26. The valve 26 adjusts the flow of the fluid according to the electric signals of the control unit 8 and adapts the brake force exerted on the brake disc 5.

Optionally, the service brake 16 can comprise a position sensor 29 to detect an actuation of the brake pedal 6 and a signal line 28 to transfer the position signal to the control unit 19 analogously to an electro-hydraulic braking system as mentioned above.

The first control unit 19 and the second control unit 8 can be connected by a signal line to exchange signals. Instead, the control unit 8 and the control unit 19 can be combined and integrated into one control unit only.

The control unit 8 is connected with the parking brake actuator 3 via a signal line 13. Analogously to the service brake 16, the parking brake 17 can be automatically applied or released by the control unit 8 by sending a corresponding trigger signal to the parking brake actuator 3.

The parking brake 16 comprises an actuation unit 9 to apply or release the parking brake 16. The actuation unit 9 comprises a brake lever mechanism for controlling the parking brake actuator 3 manually. As can be seen in FIG. 2, the brake lever mechanism can be pulled to move the brake lever mechanism from a released positon indicated by a dotted line to an applied position indicated by a solid line. The actuation unit 9 is connected with the parking brake actuator 3. According to the position of the actuation unit 9 a brake force is exerted by the parking brake actuator 3. Instead of the brake lever mechanism, the actuation unit 9 can comprise another element for operation as a button or a foot pedal.

Since the brake system 1 comprises two actuation units 6 and 9, the actuation unit 9 for controlling the parking brake 17 is referred to as first actuation unit and the actuation unit 6 for controlling the service brake 16 is referred to as second actuation in the following disclosure for an easier distinction of both actuation units.

Before the first vehicle 22 can be used in autonomous driving mode it must be ensured that the first vehicle 22 can be safely braked or stopped even in case of a failure of the control system of the vehicle 22. For example, the communications link 23, a part of the brake-by-wire system 18 or the service brake actuator 2 can fail so that the operator of the leader vehicle 21 loses control over the unmanned first vehicle 22 (follower vehicle).

In such a case, at least an emergency braking operation of the first vehicle 22 must be possible. Thus, the following description discloses how the autonomous vehicle 22 can be braked safely.

As can be seen in FIG. 2, the brake system 1 is connected with an activation device 10, e. g. a button, for activating or deactivating the autonomous driving mode of the first vehicle 22. The activation device 10 has a mechanical link 15 to the first actuation unit 9 comprising the brake lever mechanism. Alternatively, the activation device 10 can be integrated into the first actuation unit 9. The activation device 10 is connected with a mechanical interlock 11 so that the activation device 10 can only be engaged when the first actuation unit 9 is engaged and operated to apply the parking brake 17. I. e., the interlock 11 prevents an activation of the autonomous driving mode unless the parking brake 17 is applied by the first actuation unit 9. The mechanical interlock 11 can also be integrated in the first actuation unit 9.

If the first actuation unit 9 is disengaged and operated to release the parking brake 17 the mechanical interlock 11 blocks an actuation of the activation device 10 so that the activation device 10 can't be pushed or pressed by an operator in order to prevent an engagement of the autonomous driving mode.

If the first actuation unit 9 is moved out of the engaged position to a disengaged position the activation device 10 of the autonomous driving mode is disengaged by the mechanical interlock 11 as well.

Thus, it is ensured that the activation device 10 for engaging the autonomous driving mode of the first vehicle 22 can be operated only if the first actuation unit 9 was engaged and operated to apply the parking brake 17 before. I. e., in order to engage the autonomous driving mode of the first vehicle 22 two pre-requisites need to be fulfilled: The operator has to make sure that the parking brake 17 is already applied, and he has to engage the activation device 10 to enable the autonomous driving mode.

Optionally, the activation device 10 sends a signal to the control unit 8 via a signal line 14 connecting the activation device 10 with the control unit 8 when the activation device 10 was engaged to activate the autonomous driving mode. Then, the control unit 8 can send a signal via the interface 7 and the communications link 23 to the leader vehicle 21 to indicate the activated autonomous driving mode of the first vehicle 22 to the operator of the leader vehicle 21.

With the first actuation unit 9 operated to apply the parking brake 17, the parking brake 17 is released automatically when the autonomous driving mode is activated by engaging the activation device 10. When activating the autonomous driving mode, the control unit 8 triggers the parking brake actuator 3 to release the parking brake 17 while the first actuation unit 9 remains still in the engaged position. For example, the control unit 8 sends a parking brake release signal to the parking brake actuator 3 via the signal line 13. I. e., the control unit 8 overrides the parking brake demand of the engaged first actuation unit 9 for applying the parking brake 17. Then, the first vehicle 22 is free to drive without being braked by the parking brake 17.

If a brake actuation is necessary while the first vehicle 22 is operating in the autonomous driving mode the service brake 16 can be applied by the brake system 1 automatically, e. g. for distance control or collision avoidance with respect of any obstacle as for example the leader vehicle 21. Further, the operator of the leader vehicle 21 can send a brake signal remotely via the communications link 23 to the brake-by-wire system 18 of the first vehicle 22 to apply the service brake 16, too. The brake signal is received by the control unit 8 via the interface 7. Then, the control unit 8 triggers the service brake actuator 2 to apply the service brake 16 accordingly.

In case of a failure or malfunction of the braking system 1 the control unit 8 will be shut-off and the override of the parking brake demand of the engaged first actuation unit 9 will be disabled. Due to the engagement of the first actuation unit 9 for applying the parking brake 17, the parking brake 17 will automatically resume its applied state and the first vehicle 22 driving autonomously will be braked and stopped by the parking brake actuator 3.

In addition, a second safety feature is provided by the brake system 1 to prevent an unintended brake operation caused by the brake-by-wire system 18 during a disabled autonomous driving mode. Whereas it is not expected that an unintentional activation of the service brake 16 caused by the brake-by-wire system 18 during an agricultural field operation will cause a serious accident, it is when the first vehicle 22 is driving on a street, e. g. a pileup. Thus, the braking system 1 provides a mechanism that allows an actuation of the service brake 16 triggered by the control unit 8 only if the parking brake 17 was applied by the first actuation unit 9 before.

As can be seen in FIG. 2, the brake-by-wire system 18 of the service brake 16 comprises an interrupt 12 integrated between the control unit 8 and the service brake actuator 2. The interrupt 12 is controlled by the first actuation unit 9 of the parking brake 17. The interrupt 12 interrupts the signal line between the control unit 8 and the service brake actuator 2 when the first actuation unit 9 is operated to release the parking brake 17 and closes the signal line when the first actuation unit 9 is operated to apply the parking brake 17. Depending on whether the interrupt 12 interrupts the signal line between the control unit 8 and the service brake actuator 2 or not, an electronical operation of the service brake 16 through the brake-by-wire system 18 is enabled or not.

In that way, the enabling of the brake-by-wire system 18 will happen only with a first vehicle 22 braked by the parking brake 17. Further, the operator has knowingly to do two actions in order to enable the brake-by-wire system 18. The operator needs to engage the first actuation unit 9 to apply the parking brake 17 and to activate the autonomous driving mode by engaging the activation device 10. The operator won't be able to inadvertently engage the brake-by-wire system 18 just by pressing the activation device 10.

When the signal line between the control unit 8 and the brake actuator 2 is interrupted by the interrupt 12 due to disengaging the first actuation unit 9 of the parking brake 17, a brake signal sent from the control unit 8 to the service brake actuator 2 can't be received by the brake actuator 2, respectively by the electronically controllable valve 26, to generate a brake force. Since the autonomous driving mode needs to be disabled when the first vehicle 22 is driven on the streets, the first actuation unit 9 has to be disengaged with the consequence that the service brake 16 can't be applied by the brake-by-wire system 18.

But the second actuation unit 6 is independent from the brake-by-wire system 18. Thus, the second actuation unit 6 is not affected by the interrupt 12 and can be engaged to trigger the service brake actuator 2. I. e., the service brake 16 can be applied or released be the second actuation unit 6 when the electronical operation of the service brake 16 is disabled by the interrupt 12.

Instead of the interrupt 12, alternatively other devices can be implemented between the control unit 8 and the service brake actuator 2 to interlock an actuation of the service brake 16 by the control unit 8, as for example an interlock device.

As mentioned above, the autonomous driving mode can be activated or deactivated by operation of the activation device 10. In addition, the autonomous driving mode can be activated by an external unit when the first actuation unit 9 is operated to apply the parking brake 17. The external unit can be a remote control or the second vehicle 21. The operator of the external unit can send a trigger signal from the external unit via the communications link 23 to the interface 7 of the first vehicle 22. The control unit 8 receives the trigger signal and controls the (de-)activation of the autonomous driving mode accordingly.

All references cited herein are incorporated herein in their entireties. If there is a conflict between definitions herein and in an incorporated reference, the definition herein shall control.

What is claimed is:

1. A vehicle being operable in an autonomous driving mode, the vehicle comprising:

a parking brake with a first actuation unit configured to apply or release the parking brake;

an activation device configured to activate or deactivate the autonomous driving mode; and an interlock, wherein the interlock is configured to prevent an activation of the autonomous driving mode unless the parking brake is applied by the first actuation unit, wherein the interlock is configured to prevent an activation of the autonomous driving mode by blocking an actuation of the activation device.

2. The vehicle of claim 1, wherein the interlock is integrated in the first actuation unit.

3. The vehicle of claim 1, wherein the parking brake is configured to be released when the autonomous driving mode is activated.

4. The vehicle of claim 3, wherein the parking brake is configured to be released automatically when the first actuation unit is operated to apply the parking brake and the autonomous driving mode is activated.

5. The vehicle of claim 4, further comprising a control unit configured to override a trigger signal of the first actuation unit to apply the parking brake by a trigger signal to release the parking brake when the autonomous driving mode is activated.

6. The vehicle of claim 1, wherein the parking brake is configured to be applied automatically when a malfunction of the autonomous driving mode is present.

7. The vehicle of claim 1, wherein the first actuation unit comprises a brake lever mechanism.

8. The vehicle of claim 1, comprising a service brake being electronically operable; the service brake comprising an interrupt configured to enable an electronical operation of the service brake when the parking brake is activated and to disable an electronical operation of the service brake when the parking brake is deactivated.

9. The vehicle of claim 8, wherein the service brake comprises an interface configured to receive a trigger signal for applying the service brake.

10. The vehicle of claim 9, wherein the interface is configured to receive the trigger signal from an external unit.

11. The vehicle of claim 9, wherein the interface is configured to receive a trigger signal for activating or deactivating the autonomous driving mode from an external unit.

12. The vehicle of claim 8, wherein the service brake comprises a second actuation unit operable by a driver of the vehicle to apply or release the service brake when the electronical operation of the service brake is disabled by the interrupt.

13. The vehicle of claim 12, wherein the service brake is a fluid actuated brake comprising a valve controllable by an actuation of the second actuation unit and by the electronical operation to adapt a brake force of the service brake.

14. The vehicle of claim 1, comprising a service brake being electronically operable; the service brake comprising an interrupt configured to enable an electronical operation of the service brake when the autonomous driving mode is activated and to disable an electronical operation of the service brake when the autonomous driving mode is deactivated.

15. The vehicle of claim 1, wherein the autonomous driving mode is configured to control the vehicle in relation to a second vehicle.

16. The vehicle of claim 15, wherein the vehicle is configured to indicate an activation of the autonomous driving mode to the second vehicle.

17. The vehicle of claim 1, wherein the vehicle is configured to receive a trigger signal to activate or deactivate the autonomous driving mode from an external unit.

* * * * *